United States Patent
Kodama et al.

(10) Patent No.: US 10,144,349 B2
(45) Date of Patent: Dec. 4, 2018

(54) COLLISION AVOIDANCE SYSTEM AND COLLISION AVOIDANCE METHOD

(71) Applicant: The Yokohama Rubber Co., LTD., Minato-ku, Tokyo (JP)

(72) Inventors: Yuji Kodama, Hiratsuka (JP); Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/539,672

(22) PCT Filed: Dec. 26, 2014

(86) PCT No.: PCT/JP2014/084578
§ 371 (c)(1),
(2) Date: Jun. 23, 2017

(87) PCT Pub. No.: WO2016/103469
PCT Pub. Date: Jun. 30, 2016

(65) Prior Publication Data
US 2018/0257563 A1    Sep. 13, 2018

(51) Int. Cl.
*B60Q 9/00* (2006.01)
*B60W 40/08* (2012.01)
*B60W 50/14* (2012.01)

(52) U.S. Cl.
CPC ............. *B60Q 9/008* (2013.01); *B60W 40/08* (2013.01); *B60W 50/14* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,576,081 B2* | 11/2013 | Hatakeyama | A61B 5/18 180/271 |
| 9,286,515 B2* | 3/2016 | Nakamura | G08B 21/06 |

(Continued)

FOREIGN PATENT DOCUMENTS

| | | |
|---|---|---|
| EP | 2 407 947 | 1/2012 |
| JP | S63-270240 | 11/1988 |

(Continued)

OTHER PUBLICATIONS

International Search Report for International Application No. PCT/JP2014/084578 dated Mar. 31, 2015, 6 pages, Japan.

*Primary Examiner* — Travis R Hunnings
(74) *Attorney, Agent, or Firm* — Thorpe North & Western (57) ABSTRACT

A driver state detection unit is configured to detect a state of a driver of a host vehicle. An environment detection unit is configured to detect an environment in which the host vehicle is traveling. A time setting unit is configured to set a predetermined time period on the basis of the detected environment. An external warning device is configured to perform an external warning operation that warns another vehicle traveling in the vicinity of the host vehicle. When a time determination unit determines that the predetermined time period has elapsed, an internal warning device is configured to perform an internal warning operation that warns the driver of the host vehicle.

15 Claims, 6 Drawing Sheets

(52) U.S. Cl.
CPC ............ *B60W 2040/0827* (2013.01); *B60W 2050/143* (2013.01); *B60W 2520/10* (2013.01); *B60W 2550/12* (2013.01); *B60W 2550/14* (2013.01); *B60W 2550/308* (2013.01)

(56) References Cited

U.S. PATENT DOCUMENTS

| | | | | |
|---|---|---|---|---|
| 9,865,164 | B2* | 1/2018 | Konet | B60K 35/00 |
| 9,913,607 | B2* | 3/2018 | Kodama | G08G 1/16 |
| 10,000,152 | B1* | 6/2018 | Scalea | B60Q 5/006 |
| 10,026,319 | B2* | 7/2018 | Wu | G08G 1/166 |
| 2009/0237257 | A1* | 9/2009 | Yamada | A61B 5/18 |
| | | | | 340/575 |
| 2010/0007480 | A1 | 1/2010 | Uozumi et al. | |
| 2013/0069773 | A1 | 3/2013 | Li et al. | |

FOREIGN PATENT DOCUMENTS

| | | |
|---|---|---|
| JP | 3599426 | 12/2004 |
| JP | 2005-190082 | 7/2005 |
| JP | 2009-223752 | 10/2009 |
| JP | 2011-057134 | 3/2011 |
| JP | 2011-128966 | 6/2011 |
| JP | 2013-182521 | 9/2013 |
| WO | WO 2008/044119 | 4/2008 |
| WO | WO 2011/140993 | 11/2011 |

* cited by examiner

COLLISION AVOIDANCE SYSTEM AND COLLISION AVOIDANCE METHOD

TECHNICAL FIELD

The present technology relates to a collision avoidance system and a collision avoidance method.

BACKGROUND ART

Since nodding off while driving is dangerous, technology for detecting nodding off while driving is known. A device disclosed in Japanese Unexamined Patent Application Publication No. 2011-128966A detects sleepiness of a driver by obtaining feature points from an image that has captured the face of the driver. A device disclosed in Japanese Unexamined Patent Application Publication No. 2009-223752A warns the driver when a degree of risk, which is calculated on the basis of an eye opening time and an eye closing time of the driver, exceeds a threshold value.

SUMMARY

When a vehicle in which a driver is nodding off while driving approaches another vehicle, there is a risk of a collision between those two vehicles. In order to avoid the collision, the driver who is nodding off while driving needs to be warned at an appropriate timing.

The present technology provides a collision avoidance system and a collision avoidance method capable of increasing the likelihood of avoiding a collision between a traveling vehicle and another vehicle by making a warning to a driver of the traveling vehicle at an appropriate timing.

A collision avoidance system includes a driver state detection unit configured to detect a state of a driver of a host vehicle; an environment detection unit configured to detect an environment in which the host vehicle is traveling; an external warning device configured to perform an external warning operation that warns another vehicle traveling in the vicinity of the host vehicle; an internal warning device configured to perform an internal warning operation that warns the driver of the host vehicle; and a control unit configured to control the external warning device and the internal warning device on the basis of the state of the driver detected by the driver state detection unit. The control unit is further configured to set a predetermined time period on the basis of the environment detected by the environment detection unit and control the external warning device and the internal warning device, on the basis of the state of the driver, so as to perform the internal warning operation after the external warning operation has been performed and after the predetermined time period has further elapsed.

The environment detection unit may detect, as the environment, at least one of a state of a road surface on which the host vehicle is traveling, a time of day or the like at which the host vehicle is traveling, weather information of an area in which the host vehicle is traveling, and a travel speed of the host vehicle.

The collision avoidance system may further include a distance measurement unit configured to measure a distance between the host vehicle and the other vehicle, and the control unit may control the external warning device and the internal warning device so as to perform the external warning operation and the internal warning operation when the distance measured by the distance measurement unit is within a predetermined range.

The other vehicle preferably includes a following vehicle traveling behind the host vehicle.

The driver state detection unit is configured to preferably detect a state in which the driver is looking aside.

The driver state detection unit may include an image capturing unit configured to detect an image of the driver, and may detect the state of the driver looking aside on the basis of the image of the driver.

The control unit may perform the internal warning operation after the external warning operation has been performed and after the predetermined time period has further elapsed.

The external warning operation preferably includes at least one of a predetermined display operation directed at the other vehicle and a predetermined sound outputting operation directed at the other vehicle.

The external warning operation may include an operation of transmitting, to the other vehicle, a signal for activating another warning device provided in the other vehicle.

A collision avoidance method includes: detecting a state of a driver of a host vehicle; performing an external warning operation that warns another vehicle traveling in the vicinity of the host vehicle; performing an internal warning operation that warns the driver of the host vehicle; detecting an environment in which the host vehicle is traveling; and setting a predetermined time period on the basis of the environment. The collision avoidance method the performing of the internal warning operation is after the performing of the external warning operation and after the predetermined time period has elapsed.

According to a collision avoidance system and a collision avoidance method of the present technology, when it is determined that a host vehicle is traveling with the driver nodding off while driving, the likelihood of avoiding a collision between the traveling host vehicle and another vehicle can be increased by first making a warning to the other vehicle, and then making a warning to the driver of the host vehicle after the elapse of a predetermined time period, which has been set on the basis of an environment in which the host vehicle is traveling.

DETAILED DESCRIPTION

Embodiments of the present technology are described in detail below with reference to the drawings. However, the present technology is not limited by those embodiments. Further, constituents of the embodiments include elements that may be easily replaced by those skilled in the art or that are substantially identical to the constituents of the embodiments. In addition, some of the constituents may not be used in some cases.

First Embodiment

Figure 1:
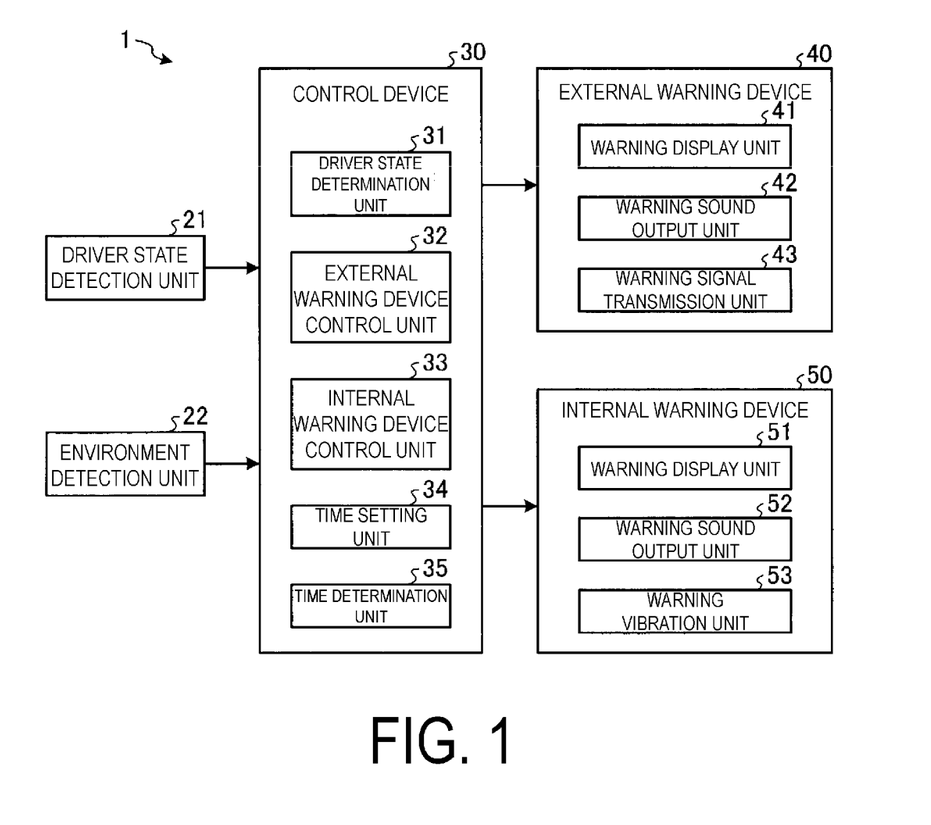
FIG. 1 is a function block diagram of a collision avoidance system according to a first embodiment.

FIG. 1 is a function block diagram of a collision avoidance system according to a first embodiment. In FIG. 1, a collision avoidance system 1 according to the present embodiment is provided in a vehicle, and includes a driver state detection unit 21, an environment detection unit 22, a control device 30, an external warning device 40, and an internal warning device 50.

The driver state detection unit 21 is configured to detect a state of a driver of a host vehicle. The driver state detection unit 21 is configured to detect a drowsing state of the driver, for example.

The driver state detection unit 21 may include a brain wave sensor configured to detect brain waves of the driver, and detect the nodding-off state of the driver on the basis of the brain waves of the driver. The driver state detection unit 21 may detect the drowsing state of the driver on the basis of at least one of theta waves and alpha waves of the brain waves. Note that the brain wave is a sum of electrical changes of a neuronal population existing beneath an electrode placed on the scalp or the cranium. The electrical changes are detected by the electrode.

The driver state detection unit 21 may further include a myoelectric sensor configured to obtain an electromyogram of the driver, and detect the drowsing state of the driver on the basis of the brain waves and the electromyogram of the driver. The driver state detection unit 21 may detect the drowsing state of the driver on the basis of the electromyogram and the theta waves and the alpha waves of the brain waves, for example. Note that the electromyogram is a sum of electrical changes resulting from muscular contractions.

The driver state detection unit 21 may include an image capturing unit configured to detect an image of the driver, and detect the drowsing state of the driver on the basis of the image of the driver. The driver detection unit 21 may capture an image of the face of the driver and determine whether or not the driver is in the drowsing state by analyzing the image, for example. More specifically, the driver detection unit 21 can determine that the driver is in the drowsing state when an eye closing time of the driver is longer than an eye opening time of the driver.

The driver state detection unit 21 may include a biophotonic measurement device configured to measure cerebral hemodynamic changes of the driver, and detect the drowsing state of the driver on the basis of the cerebral hemodynamic changes of the driver. For example, the driver state detection unit 21 may detect the drowsing state of the driver by using a biophotonic measurement device disclosed in Japanese Patent No. 3599426.

The environment detection unit 22 is configured to detect an environment in which the host vehicle is traveling.

The environment detection unit 22 may detect a state of a road surface of a road on which the host vehicle is traveling. With respect to the state of the road surface, a light emitting element and a light receiving element may be provided in a lower part of a vehicle body of the host vehicle, for example. Then, a wet road surface can be detected when a degree of polarization of reflected light from the road surface is close to "1", and a dry road surface can be detected when the degree of polarization is close to zero as a result of diffuse reflection.

The environment detection unit 22 may detect a possibility that the road surface of the road on which the host vehicle is traveling may be frozen. A thermometer may be provided in the vehicle body of the host vehicle, for example. Then, the environment detection unit 22 can detect the possibility that the road surface may be frozen when the temperature is close to 0° C., and the time of day or the like at which the host vehicle is traveling is the winter season and early morning.

The environment detection unit 22 may obtain weather information of an area in which the host vehicle is traveling and thereby detect the state of the road surface on which the host vehicle is traveling. By obtaining weather information indicating that it is raining in the area in which the host vehicle is traveling, for example, the environment detection unit 22 can detect a possibility that the road surface may be wet. Further, by obtaining weather information indicating it is snowing in the area in which the host vehicle is traveling, for example, the environment detection unit 22 can detect a possibility that snow may be attached to the road surface. Furthermore, raining or snowing can be detected on the basis of an operating state of wipers of the host vehicle.

The environment detection unit 22 may detect a travel speed of the host vehicle. The travel speed of the host vehicle can be detected by a speedometer.

As described above, the environment detection unit 22 is configured to detect at least one of the state of the road surface on which the host vehicle is traveling, the time of day or the like at which the host vehicle is traveling, the weather information of the area in which the host vehicle is traveling, and the travel speed of the host vehicle.

The control device 30 includes a driver state determination unit 31, an external warning device control unit 32, an internal warning device control unit 33, a time setting unit 34, and a time determination unit 35.

The driver state determination unit 31 is configured to determine the state of the driver on the basis of a detection result of the driver state detection unit 21. When the detection result of the driver state determination unit 21 is outside a predetermined range, for example, the driver state detection unit 31 is configured to determine that the driver is in the drowsing state.

The external warning device control unit 32 is configured to control the external warning device 40, and perform a warning operation that warns another vehicle traveling in the vicinity of the host vehicle. The internal warning device control unit 33 is configured to control the internal warning device 50, and perform a warning operation that warns the driver of the host vehicle.

The time setting unit 34 is configured to set a predetermined time period on the basis of the environment detected by the environment detection unit 22. Note that the predetermined time period set by the time setting unit 34 is a time period from a point of time at which the warning operation is performed by the external warning device 40 to a point of time at which the warning operation is performed by the internal warning device 50.

The time setting unit 34 is configured to set the predetermined time period, which is determined by the time determination unit 35, on the basis of the detection result of the environment detection unit 22. The time setting unit 34 is configured to set the predetermined time period, which is determined by the time determination unit 35, on the basis of at least one of the state of the road surface on which the host vehicle is traveling, the time of day or the like at which the host vehicle is traveling, the weather information of the area in which the host vehicle is traveling, and the travel speed of the host vehicle.

The time setting unit 34 is configured to set a longer predetermined time period when the state of the road surface indicates that a braking distance may be longer on the road on which the host vehicle is traveling. When the environment detection unit 22 detects that the road surface is wet, for example, the time setting unit 34 is configured to set the predetermined time period to be longer than that of a case when the road surface is dry. In this way, a sufficient time period can be secured between the warning for the outside of the vehicle and the warning for the inside of the vehicle, and a sufficient operation time can be secured for the other vehicle traveling in the vicinity of the host vehicle. As a result, the likelihood of avoiding a collision can be increased.

Further, when the environment detection unit 22 detects the possibility that the road surface may be frozen, the time setting unit 34 is configured to set the predetermined time period to be longer than that of a case when the road surface is not frozen. In this way, a sufficient time period can be secured between the warning for the outside of the vehicle and the warning for the inside of the vehicle, and a sufficient operation time can be secured for the other vehicle traveling in the vicinity of the host vehicle. As a result, the likelihood of avoiding a collision can be increased.

When the environment detection unit 22 detects that the host vehicle is traveling at a high speed, the time setting unit 34 is configured to set the predetermined time period to be longer than that of a case when the host vehicle is traveling at a low speed. In this way, a sufficient time period can be secured between the warning for the outside of the vehicle and the warning for the inside of the vehicle, and a sufficient operation time can be secured for the other vehicle traveling in the vicinity of the host vehicle. As a result, the likelihood of avoiding a collision can be increased.

Note that setting values of the predetermined time period described above may be changeable by the driver as well as being set by the time setting unit 34.

The time determination unit 35 is configured to determine a time period that has elapsed from a point of time at which the external warning device 40 has made a warning to the other vehicle. When the predetermined time period set by the time setting unit 34 has elapsed from the point of time at which the external warning device 40 has made the warning to the other vehicle, the time determination unit 35 is configured to activate the internal warning device 50 and make a warning to the driver of the host vehicle.

The external warning device 40 is configured to perform the warning operation that warns the other vehicle traveling in the vicinity of the host vehicle. The external warning device 40 includes a warning display unit 41, a warning sound output unit 42, and a warning signal transmission unit 43.

The warning display unit 41 is configured to make a warning by lighting a lamp, displaying an image, or the like, for example. Here, the lamp is not limited to a lamp originally provided in the vehicle to satisfy traffic regulations. In addition to lighting the lamp, the display of the image may be carried out by flashing a lamp (for example, flashing the brake lamps). The display of the image is carried out by displaying a predetermined message on a display device using well known LEDs, a liquid crystal display, or the like, for example.

The warning sound output unit 42 is configured to make a warning by outputting a warning sound. The warning sound includes a synthesized voice.

The warning signal transmission unit 43 is configured to wirelessly transmits a warning signal to another vehicle, such as a following vehicle, in order to operate another warning device provided in that vehicle.

The vehicle that has received the warning signal from the warning signal transmission unit 43 is configured to operate the warning device provided in that vehicle and make a warning to the driver of that vehicle.

The internal warning device 50 is configured to perform the warning operation that warns the driver of the host vehicle. The internal warning device 50 includes a warning display unit 51, a warning sound output unit 52, and a warning vibration unit 53.

The warning display unit 51 is configured to make a warning by lighting a lamp, displaying an image, or the like, for example. The display of the image is carried out by displaying a predetermined message on a display device using well known LEDs, a liquid crystal display, or the like, for example. When a navigation device is installed in the host vehicle, the image may be displayed on a liquid crystal display of the navigation device.

The warning sound output unit 52 is configured to make a warning by outputting a warning sound. The warning sound includes a synthesized voice.

The warning vibration unit 53 is configured to make a warning by causing an interior component of the host vehicle to vibrate. The warning vibration unit 53 is configured to make a warning to the driver by causing a part of the steering wheel held by the driver to vibrate, for example.

Figure 2:
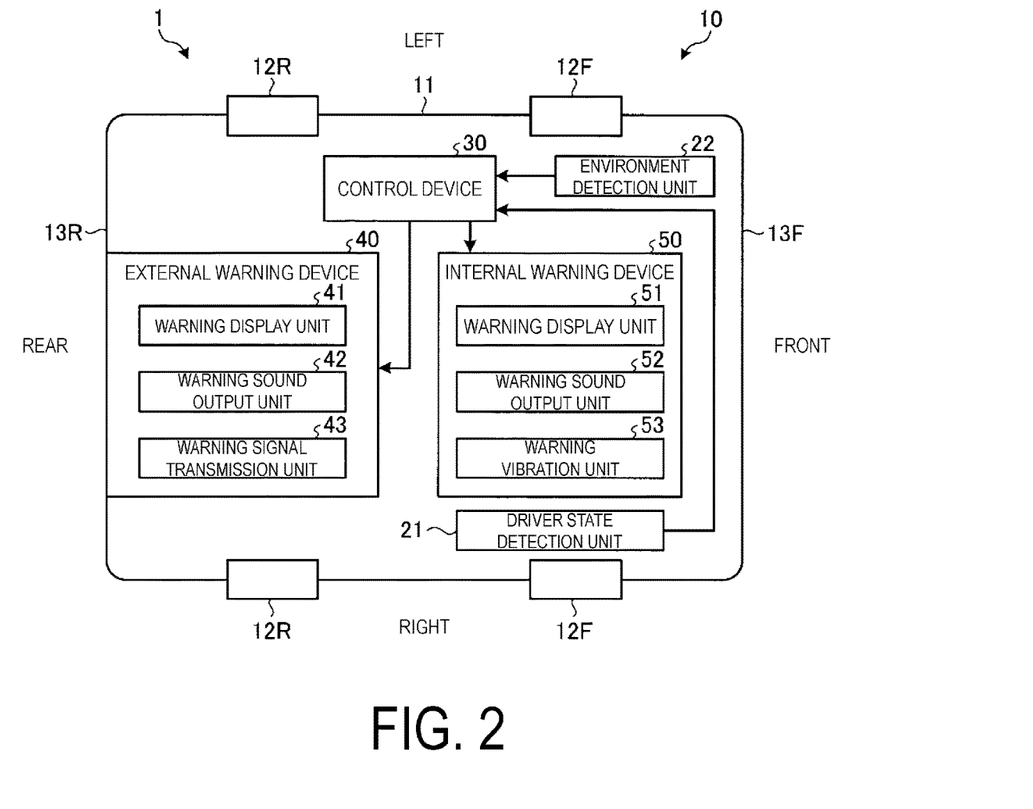
FIG. 2 is a diagram schematically illustrating an example of a vehicle provided with the collision avoidance system according to the first embodiment.

FIG. 2 is a diagram schematically illustrating an example of a vehicle provided with the collision avoidance system according to the present embodiment. As illustrated in FIG. 2, a host vehicle 10 is a four-wheeled vehicle in the present embodiment. The host vehicle 10 has two front wheels 12F and two rear wheels 12R. The host vehicle 10 has a driver cab that a driver occupies. Note that the host vehicle 10 may be a vehicle other than the four-wheeled vehicle.

Figure 3:
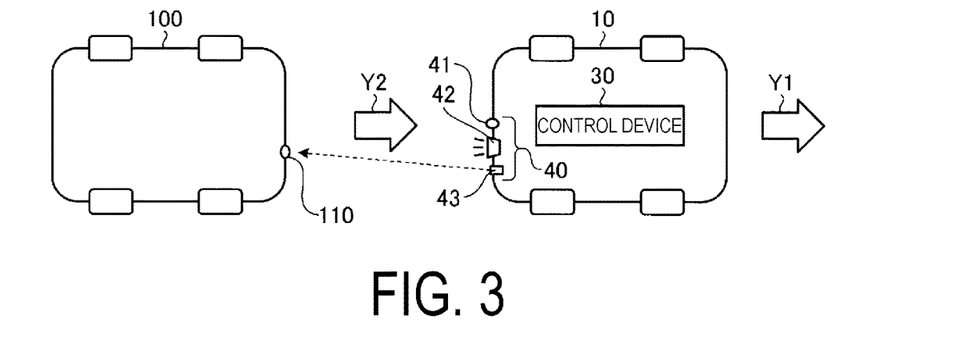
FIG. 3 is a diagram schematically illustrating operations performed by the collision avoidance system illustrated in FIGS. 1 and 2.

FIG. 3 is a diagram schematically illustrating operations performed by the collision avoidance system according to the present embodiment. In FIG. 3, the host vehicle 10 travels in the direction of an arrow Y1, and a following vehicle 100 travels in the direction of an arrow Y2.

In the host vehicle 10, the control device 30 activates the external warning device 40, and the external warning device 40 then performs the warning operation. The warning operation performed by the external warning device 40 is at least one of a warning by lighting a lamp or displaying an image by the warning display unit 41, a warning by outputting a warning sound by the warning sound output unit 42, and a warning using the warning device in another vehicle through transmitting a warning signal from the warning signal transmission unit 43.

The warning by lighting a lamp or displaying an image by the warning display unit 41 appeals to the sense of sight of the driver of the following vehicle 100.

The warning by outputting a warning sound by the warning sound output unit 42 appeals to the sense of hearing of the driver of the following vehicle 100.

The warning signal transmitted from the warning signal transmission unit 43 is received by a warning signal reception unit 110 of the following vehicle 100. This operation enables a warning appealing to the sense of sight or hearing of the driver in the following vehicle 100.

Such warnings may be made to a vehicle traveling on the left or right side (including diagonally forward and backward areas) of the host vehicle 10 in addition to the following vehicle 100. The following vehicle 100 or the vehicle traveling on the left or right side (including diagonally forward and backward areas) of the host vehicle 10 may make a warning to another vehicle traveling further behind.

Figure 4:
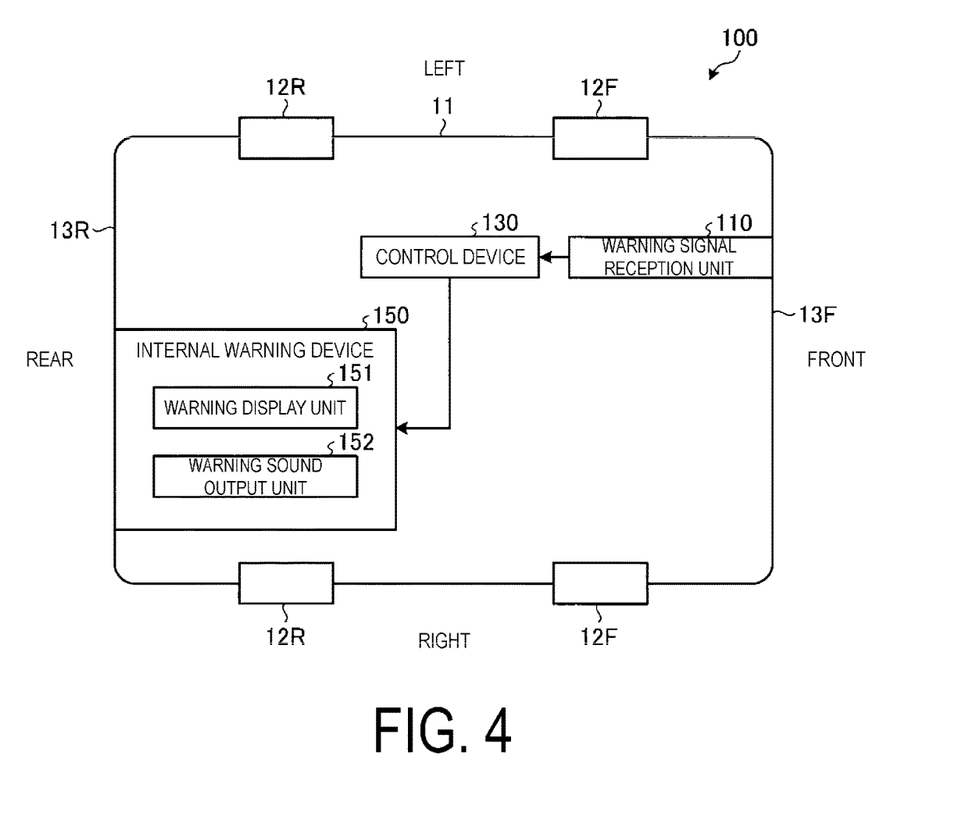
FIG. 4 is a diagram schematically illustrating an example of another vehicle traveling in the vicinity of a host vehicle provided with the collision avoidance system according to the present embodiment.

FIG. 4 is a diagram schematically illustrating an example of another vehicle traveling in the vicinity of the host vehicle provided with the collision avoidance system according to the present embodiment. FIG. 4 illustrates an example in which the other vehicle is the following vehicle.

As illustrated in FIG. 4, the following vehicle 100 is a four-wheeled vehicle in the present embodiment. The following vehicle 100 has the two front wheels 12F and the two rear wheels 12R. The following vehicle 100 has a driver cab that a driver occupies. The following vehicle 100 is provided with the warning signal reception unit 110, a control device 130, and an internal warning device 150. Note that the following vehicle 100 may be a vehicle other than the four-wheeled vehicle.

The warning signal reception unit 110 is disposed in a front part 13F of a vehicle body 11 and is configured receive the warning signal transmitted by the host vehicle 10 in FIG. 3. When receiving the warning signal, the warning signal reception unit 110 is configured to activate the control device 130.

The control device 130 activated by the warning signal reception unit 110 is configured to control the internal warning device 150, and make a warning to the driver of the following vehicle 100.

The internal warning device 150 is disposed in a rear part 13R of the vehicle body 11 and includes a warning display unit 151 and a warning sound output unit 152. The warning display unit 151 is configured make a warning by lighting a lamp, displaying an image, or the like, to the driver of the following vehicle 100. The warning sound output unit 152 is configured to make a warning by outputting a warning sound to the driver of the following vehicle 100. The warning sound includes a synthesized voice.

Operations of the collision avoidance system according to the present embodiment will now be described. The driver state detection unit 21 is configured to detect the state of the driver of the host vehicle 10. The driver state determination unit 31 is configured to determine whether or not the state of the driver detected by the driver state detection unit 21 is the drowsing state.

When the driver state determination unit 31 determines that the driver of the host vehicle 10 is in the drowsing state, the environment detection unit 22 is configured to detect the environment in which the host vehicle 10 is traveling. Then, the time setting unit 34 is configured to set the predetermined time period on the basis of the environment detected by the environment detection unit 22. The external warning device control unit 32 is configured to activate the external warning device 40. The external warning device 40 is configured to make a warning to the other vehicle. After that, when the time determination unit 35 determines that the predetermined time period has elapsed, the internal warning device control unit 33 is configured to activate the internal warning device 50. The internal warning device 50 is configured to make a warning to the driver of the host vehicle. Thus, the external warning device 40 is configured to make a warning to the other vehicle, and after the predetermined time period has elapsed, the internal warning device 50 is configured to then make a warning to the driver of the host vehicle.

With the operations described above, on the basis of the state of the driver of the host vehicle, such as the drowsing state, the warning can be made to the other vehicle in the vicinity of the host vehicle, and after the predetermined time period has elapsed, the warning can be made to the driver of the host vehicle. If the warning is made to the driver first, the driver who has woken up from the drowsing state may perform such an operation as sudden braking or abrupt steering. As in the operations described above, by securing the sufficient time period after making the warning to the other vehicle before making the warning to the driver of the host vehicle, even when the driver wakes up from the drowsing state in response to the warning made by the internal warning device 50 and performs an operation such as sudden braking or abrupt steering, since the warning is made to the other vehicle by the external warning device 40 in advance of the warning to the driver of the host vehicle, the driver of the other vehicle can be expected to perform a braking, accelerating, or steering operation in an appropriate manner, and can thus avoid a collision.

Second Embodiment

Figure 5:
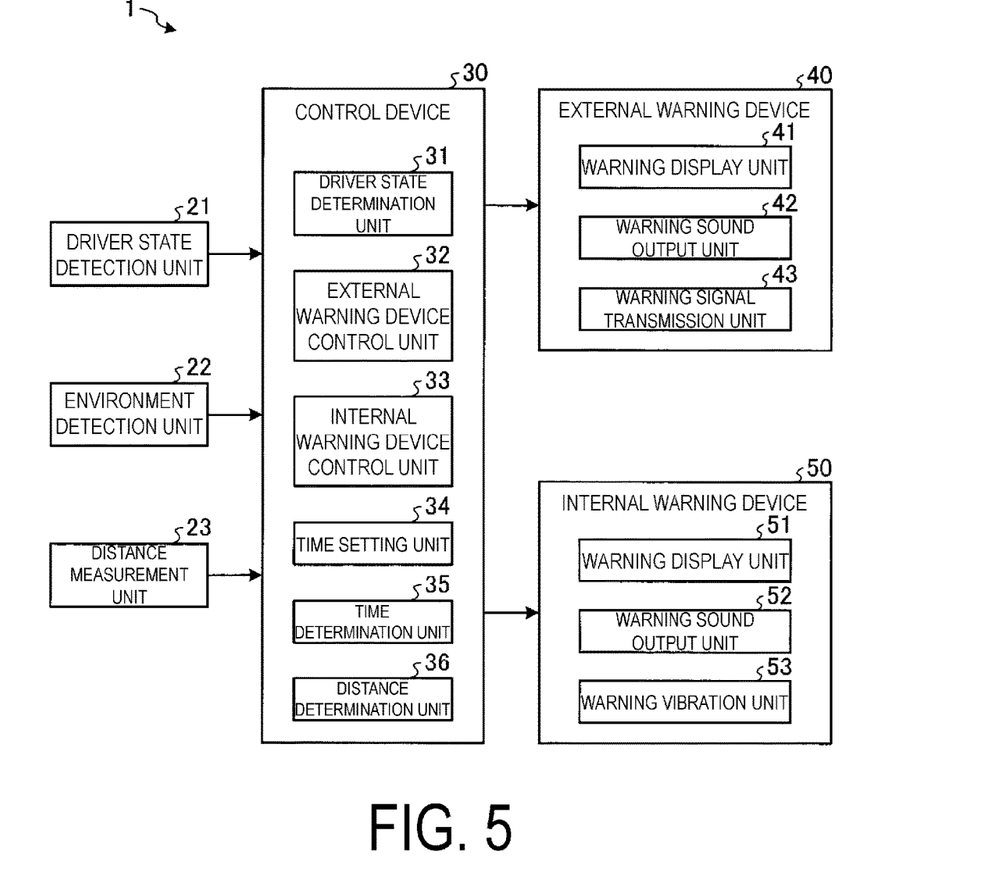
FIG. 5 is a function block diagram of the collision avoidance system according to a second embodiment.

FIG. 5 is a function block diagram of the collision avoidance system according to a second embodiment. The collision avoidance system 1 according to the present embodiment illustrated in FIG. 5 has the same configuration as that of the collision avoidance system according to the first embodiment described with reference to FIGS. 1 and 2, and further includes a distance measurement unit 23 and a distance determination unit 36.

The distance measurement unit 23 is configured to measure, in a non-contact manner, a distance between a vehicle (the host vehicle) and another vehicle traveling in the vicinity of the host vehicle. The vehicle traveling in the vicinity of the host vehicle is, for example, one or both of a following vehicle traveling behind the host vehicle and a vehicle traveling to a side (the left or right side) of the host vehicle. In addition to the vehicle traveling directly behind the host vehicle, the following vehicle to be measured by the distance measurement unit 23 may be, for example, a vehicle traveling diagonally to the rear of the host vehicle. The vehicle traveling to a side to be measured by the distance measurement unit 23 may be, for example, a vehicle traveling diagonally to the front of the host vehicle. The distance measurement unit 23 is configured to perform the measurement at a predetermined cycle (for example, every second).

The distance measurement unit 23 includes a radar device (a millimeter wave radar device, a Doppler radar device, or the like). The radar device can measure a distance between the host vehicle and the other vehicle by emitting radio waves (or ultrasonic waves) and then receiving the radio waves (or ultrasonic waves) reflected by an object. Note that the distance measurement unit 23 may include at least one of a laser scanner and a three-dimensional rangefinder. The distance measurement unit 23 may include an imaging device (a camera) capable of detecting an object in a non-contact manner by capturing an optical image of the object. The distance measurement unit 23 including the imaging device may measure a distance on the basis of the captured image. For example, the distance between the host vehicle and the other vehicle can be obtained on the basis of the size of the other vehicle in the captured image. The distance measurement unit 23 is configured to perform the measurement at a predetermined cycle (for example, every second).

The distance determination unit 36 is configured to determine whether or not the distance between the host vehicle and the other vehicle traveling in the vicinity of the host vehicle, measured by the distance measurement unit 23, is within a predetermined range (for example, within 20 m). When the distance between the host vehicle and the other vehicle measured by the distance measurement unit 23 is within the predetermined range (for example, within 20 m), the distance determination unit 36 is configured to activate the external warning device control unit 32 and the internal warning device control unit 33. The external warning device control unit 32 is configured to make a warning using the external warning device 40, and the internal warning device control unit 33 is configured to make a warning using the internal warning device 50.

When the distance between the host vehicle and the other vehicle measured by the distance measurement unit 23 is not within the predetermined range (for example, exceeds 20 m), the distance determination unit 36 is configured to not activate the external warning device control unit 32, nor the internal warning device control unit 33. Thus, the internal warning device control unit 33 is configured to not cause the internal warning device 50 to make the warning.

Figure 6:
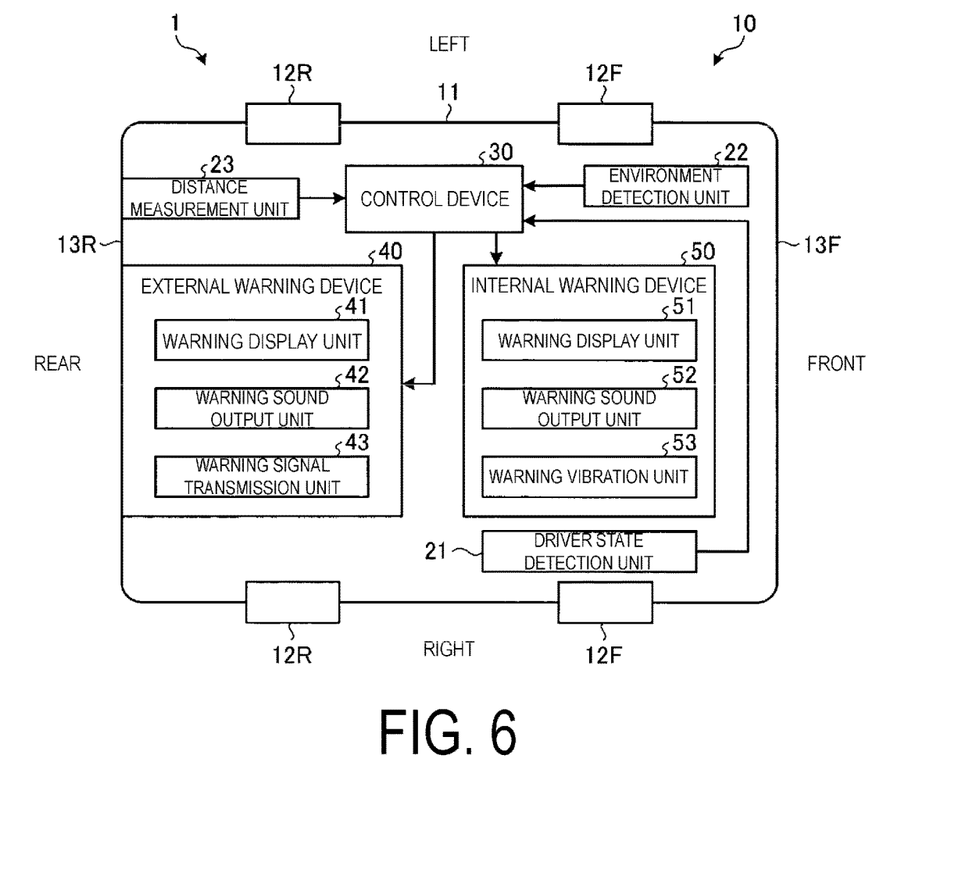
FIG. 6 is a diagram schematically illustrating an example of a vehicle provided with the collision avoidance system according to the second embodiment.

FIG. 6 is a diagram schematically illustrating an example of a vehicle provided with the collision avoidance system according to the present embodiment. As illustrated in FIG. 6, the vehicle body 11 according to the present embodiment has the same configuration as that described with reference to FIG. 2, and further includes the distance measurement unit 23. That is, the host vehicle 10 includes the distance measurement unit 23 disposed in the rear part 13R of the vehicle body 11. The distance measurement unit 23 can thus detect, in a non-contact manner, a distance from the host vehicle 10 to the following vehicle traveling behind the host vehicle 10. In addition to the vehicle traveling directly behind the host vehicle, the distance measurement unit 23 may detect, in a non-contact manner, a distance to a vehicle traveling diagonally to the rear of the host vehicle or to a side of the host vehicle, for example.

Note that another vehicle traveling in the vicinity of the host vehicle 10, such as the following vehicle, has the same configuration as that described above with reference to FIGS. 3 and 4.

Operations of the collision avoidance system according to the present embodiment will now be described. The driver state detection unit 21 is configured to detect the state of the driver of the host vehicle 10. The driver state determination unit 31 is configured to determine whether or not the state of the driver detected by the driver state detection unit 21 is the drowsing state.

When the driver state determination unit 31 determines that the driver is in the drowsing state, the distance determination unit 36 is configured to determine whether or not the distance between the host vehicle and the other vehicle traveling in the vicinity of the host vehicle, measured by the distance measurement unit 23, is within the predetermined range.

When the distance determination unit 36 determines that the distance between the host vehicle and the other vehicle traveling in the vicinity of the host vehicle is within the predetermined range, the environment detection unit 22 is configured to detect the environment in which the host vehicle 10 is traveling. Then, the time setting unit 34 is configured to set the predetermined time period on the basis of the environment detected by the environment detection unit 22. The external warning device control unit 32 is configured to activate the external warning device 40. The external warning device 40 is configured to make a warning to the other vehicle. After that, when the time determination unit 35 determines that the predetermined time period has elapsed, the internal warning device control unit 33 is configured to activate the internal warning device 50. The internal warning device 50 is configured to make a warning to the driver of the host vehicle. Thus, the external warning device 40 is configured to make a warning to the other vehicle, and after the predetermined time period has elapsed, the internal warning device 50 is configured to then make a warning to the driver of the host vehicle.

Meanwhile, when the distance determination unit 36 determines that the distance between the host vehicle and the other vehicle traveling in the vicinity of the host vehicle is not within the predetermined range (exceeds the predetermined range), the external warning device control unit 32 and the internal warning device control unit 33 are configured to not activate the external warning device 40 and the internal warning device 50. Thus, neither the external warning device 40 nor the internal warning device 50 is configured to make the warning.

With the operations described above, when it is determined that the host vehicle is traveling with the driver nodding off while driving, if the distance between the host vehicle and the other vehicle in the vicinity of the host vehicle is within the predetermined range, after making the warning to the other vehicle, the warning can be made to the driver of the host vehicle. Thus, even when the driver wakes up from the drowsing state in response to the warning made by the internal warning device 50 and performs such an operation as sudden braking or abrupt steering, since the warning is made to the other vehicle by the external warning device 40 in advance of the warning to the driver of the host vehicle, the driver of the other vehicle can be expected to perform a braking, accelerating, or steering operation in an appropriate manner, and can thus avoid a collision.

In the collision avoidance system according to the second embodiment, in contrast to the first embodiment, it is considered that a collision is not likely to occur in the case where the distance between the host vehicle and the other vehicle exceeds the predetermined range. Since the warning is not required in this case, neither the external warning device 40 nor the internal warning device 50 is configured to make the warning. Thus, an unnecessary warning can be prevented.

Modified examples of the collision avoidance system according to the present embodiment will now be described.

First Modified Example

The driver state detection unit 21 and the driver state determination unit 31 may detect and determine an elapsed time period from a driving start time. For example, when the host vehicle 10 is a rental vehicle, immediately after the driver starts driving the vehicle (if the elapsed time period from the driving start time is short), the driver may not be yet used to driving the host vehicle 10. In such a case, by making a warning to another vehicle, sufficient time can be secured for a driver of the other vehicle to perform a braking, accelerating, or steering operation in an appropriate manner, and a collision can thus be avoided. Also, when the host vehicle 10 is a rental vehicle, the predetermined time period set by the time setting unit 34 may be set to be longer than that of a case in which the host vehicle is not the rental vehicle.

Second Modified Example

A warning to another vehicle may be made in accordance with an attribute of the driver. For example, the driver may input in advance such information as a driving history, a color of the driver's license (a gold license or not, for example), and a type of the driver's license (whether the driver is licensed to drive large size vehicles or not, or the like), and the predetermined time period set by the time setting unit 34 may be adjusted on the basis of the information.

Third Modified Example

A warning may be made to another vehicle when a mobile phone, a smartphone, or the like receives a call during driving. Even when the driver reacts to (is surprised by) a ringtone and performs such an operation as sudden braking or abrupt steering, since the warning is made to the other vehicle by the external warning device 40 before the warning is made to the driver of the host vehicle 10, the driver of the other vehicle can be expected to perform a braking, accelerating, or steering operation in an appropriate manner, and can thus avoid a collision. The ringtone can be detected by installing a microphone in the vehicle.

Fourth Modified Example

The driver state detection unit 21 and the driver state determination unit 31 may detect and determine other states of the driver in addition to the drowsing state. For example, by detecting the driver looking aside, or an occurrence of a seizure caused by a medical condition of the driver, after making a warning to another vehicle using the external warning device 40, the internal warning device 50 may make a warning to the driver of the host vehicle 10. A state in which the driver is looking aside can be detected by capturing an image of the face of the driver and analyzing the image. Further, a seizure caused by the medical condition of the driver can be detected by using an electromyogram, for example.

Collision Avoidance Method

Figure 7:
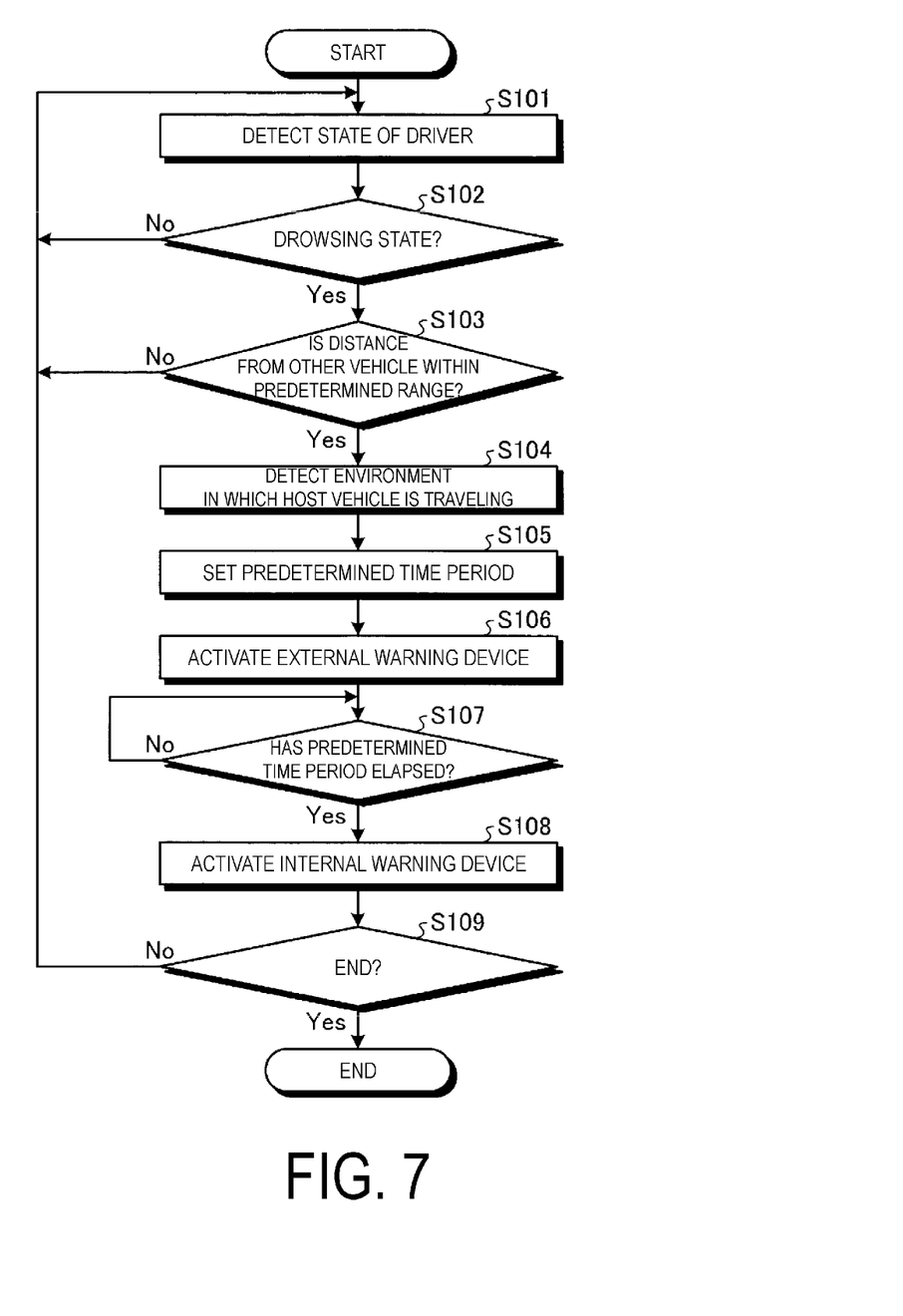
FIG. 7 is a flowchart illustrating an example of a collision avoidance method carried out by the collision avoidance system according to the present embodiment.

FIG. 7 is a flowchart illustrating an example of a collision avoidance method carried out by the collision avoidance system according to the present embodiment. In FIG. 7, the driver state detection unit 21 is configured to detect the state of the driver of the host vehicle 10 (step S101). The driver state determination unit 31 is configured to determine whether or not the state of the driver detected by the driver state detection unit 21 is the drowsing state (step S102).

When the driver state determination unit 31 determines that the driver is in the drowsing state (Yes at step S102), the distance determination unit 36 is configured to determine whether or not the distance between the host vehicle and another vehicle traveling in the vicinity of the host vehicle, measured by the distance measurement unit 23, is within the predetermined range (step S103).

When the distance determination unit 36 determines that the distance between the host vehicle and the other vehicle traveling in the vicinity of the host vehicle is within the predetermined range (Yes at step S103), the environment detection unit 22 is configured to detect the environment in which the host vehicle is traveling (step S104). Further, the time setting unit 34 is configured to set the predetermined time period on the basis of the environment detected by the environment detection unit 22 (step S105).

The external warning device control unit 32 is configured to activate the external warning device 40 and make a warning (step S106).

After that, the time determination unit 35 is configured to determine whether or not the predetermined time period set by the time setting unit 34 has elapsed (step S107). When the time determination unit 35 determines that the predetermined time period has elapsed (Yes at step S107), the internal warning device control unit 33 is configured to activate the internal warning device 50 and make a warning (step S108).

After that, it is determined whether or not processing by this system is complete (step S109). If the processing by the system is complete (Yes at step S109), the processing by the system ends. If the processing by the system is not complete (No at step S109), the processing by the system continues.

When the driver state determination unit 31 determines that the driver of the host vehicle 10 is not in the drowsing state at step S102 (No at step S102), or when the distance determination unit 36 determines at step S103 that the distance between the host vehicle and the other vehicle traveling in the vicinity of the host vehicle is not within the predetermined range (No at step S103), the processing returns to step S101, and the system continues the processing.

When the time determination unit 35 determines at step S107 that the predetermined time period has not elapsed (No at step S107), the processing returns to step S107, and the time determination unit 35 is configured to continue the determination processing.

Note that the processing at step S103 may be omitted. If the processing at step S103 is not performed (corresponding to the first embodiment), when the driver state determination unit 31 determines that the driver of the host vehicle 10 is in the drowsing state (Yes at step S102), regardless of the distance between the host vehicle and the other vehicle traveling in the vicinity of the host vehicle, the environment in which the host vehicle is traveling is detected (step S104), and the predetermined time period is set (step S105). After that, the external warning device control unit 32 is configured to activate the external warning device 40 and make a warning (step S106), and after the predetermined time period has elapsed (Yes at step S107), the internal warning device control unit 33 is configured to activate the internal warning device 50 and make a warning (step S108).

The processing at step S104 and the processing at step S105 may be performed before the processing at step S101. In this case, since the time setting unit 34 sets the predetermined time period on the basis of the environment detected by the environment detection unit 22, regardless of the state of the driver, a time period from when the state of the driver (such as the drowsing state) is detected to when the external warning device 40 makes the warning can be shortened.

The invention claimed is:

1. A collision avoidance system comprising:
    a driver state detection unit configured to detect a state of a driver of a host vehicle;
    an environment detection unit configured to detect an environment in which the host vehicle is traveling;
    an external warning device configured to perform an external warning operation that warns another vehicle traveling in a vicinity of the host vehicle;

an internal warning device configured to perform an internal warning operation that warns the driver of the host vehicle; and a control unit configured to control the external warning device and the internal warning device on a basis of the state of the driver detected by the driver state detection unit, the control unit configured to set a predetermined time period on a basis of the environment detected by the environment detection unit, and control the external warning device and the internal warning device, on the basis of the state of the driver, so as to perform the internal warning operation after the external warning operation has been performed and after the predetermined time period has further elapsed.

2. The collision avoidance system according to claim 1, wherein
the environment detection unit is configured to detect, as the environment, at least one of a state of a road surface on which the host vehicle is traveling, a time of day or the like at which the host vehicle is traveling, weather information of an area in which the host vehicle is traveling, and a travel speed of the host vehicle.

3. The collision avoidance system according to claim 1, further comprising:
a distance measurement unit configured to measure a distance between the host vehicle and the other vehicle, wherein
the control unit is configured to control the external warning device and the internal warning so as to perform the external warning operation and the internal warning operation when the distance measured by the distance measurement unit is within a predetermined range.

4. The collision avoidance system according to claim 1, wherein
the other vehicle includes a following vehicle traveling behind the host vehicle.

5. The collision avoidance system according to claim 1, wherein
the driver state detection unit is configured to detect a state in which the driver is looking aside.

6. The collision avoidance system according to claim 5, wherein
the driver state detection unit includes an image capturing unit configured to detect an image of the driver and detect the state of the driver looking aside on a basis of the image of the driver.

7. The collision avoidance system according to claim 1, wherein
the external warning operation includes at least one of a predetermined display operation directed at the other vehicle and a predetermined sound outputting operation directed at the other vehicle.

8. The collision avoidance system according to claim 1, wherein
the external warning operation includes an operation of transmitting, to the other vehicle, a signal for activating another warning device provided in the other vehicle.

9. A collision avoidance method comprising:
detecting a state of a driver of a host vehicle;
performing an external warning operation that warns another vehicle traveling in a vicinity of the host vehicle;
performing an internal warning operation that warns the driver of the host vehicle;
detecting an environment in which the host vehicle is traveling; and
setting a predetermined time period on a basis of the environment,
wherein the performing of the internal warning operation is after the performing of the external warning operation and after the predetermined time period has elapsed.

10. The collision avoidance system according to claim 2, further comprising:
a distance measurement unit configured to measure a distance between the host vehicle and the other vehicle, wherein
the control unit is configured to control the external warning device and the internal warning so as to perform the external warning operation and the internal warning operation when the distance measured by the distance measurement unit is within a predetermined range.

11. The collision avoidance system according to claim 10, wherein
the other vehicle includes a following vehicle traveling behind the host vehicle.

12. The collision avoidance system according to claim 11, wherein
the driver state detection unit is configured to detect a state in which the driver is looking aside.

13. The collision avoidance system according to claim 12, wherein
the driver state detection unit includes an image capturing unit configured to detect an image of the driver and detect the state of the driver looking aside on a basis of the image of the driver.

14. The collision avoidance system according to claim 13, wherein
the external warning operation includes at least one of a predetermined display operation directed at the other vehicle and a predetermined sound outputting operation directed at the other vehicle.

15. The collision avoidance system according to claim 14, wherein
the external warning operation includes an operation of transmitting, to the other vehicle, a signal for activating another warning device provided in the other vehicle.

* * * * *